Figure 1:
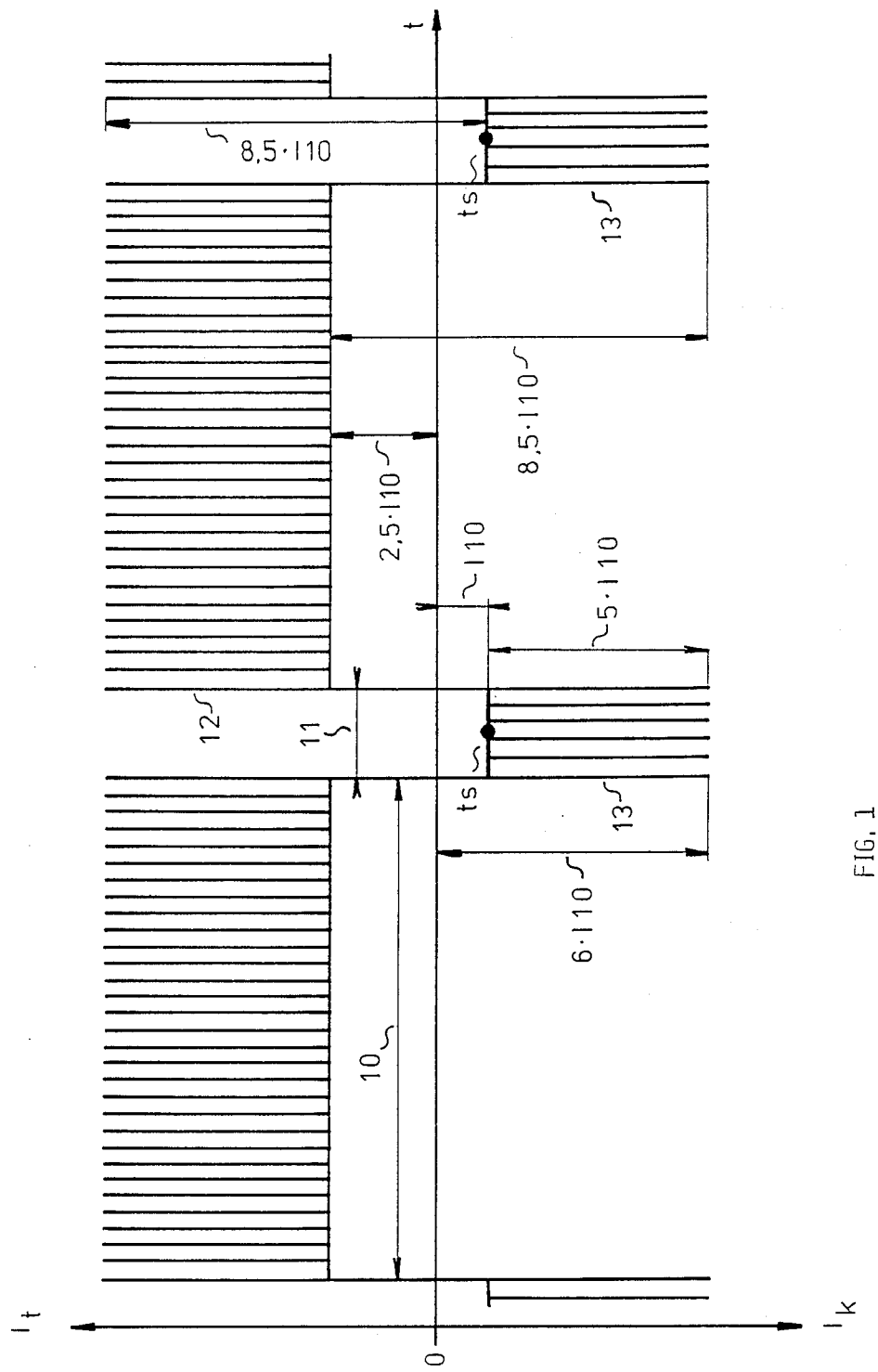

United States Patent [19]
Gábor et al.

[11] Patent Number: 4,878,007
[45] Date of Patent: Oct. 31, 1989

[54] METHOD FOR CHARGING NICKEL-CADMIUM BATTERIES AND CIRCUIT ARRANGEMENT FOR CARRYING OUT THE METHOD

[75] Inventors: Szóradi Gábor; Nagy Sándor, both of Budapest, Hungary

[73] Assignee: BRG Mechatronikai Vallalat, Hungary

[21] Appl. No.: 126,887

[22] Filed: Nov. 30, 1987

[30] Foreign Application Priority Data

Dec. 1, 1986 [HU] Hungary .............................. 4949/86

[51] Int. Cl.[4] .............................. H02J 7/00; H02J 7/10
[52] U.S. Cl. .......................................... 320/14; 320/21
[58] Field of Search ........................ 320/14, 20, 21, 19

[56] References Cited

U.S. PATENT DOCUMENTS

| | | | |
|---|---|---|---|
| 2,503,179 | 4/1950 | Tichenor | 320/21 X |
| 3,258,761 | 6/1966 | Wales | 320/37 X |
| 3,732,481 | 5/1973 | Mas | 320/14 |
| 4,211,969 | 7/1980 | Steigerwald | 320/14 |
| 4,385,269 | 5/1983 | Aspinwall et al. | 320/14 |
| 4,568,869 | 2/1986 | Graham, Jr. | 320/21 X |
| 4,641,078 | 2/1987 | Short | 320/21 |

FOREIGN PATENT DOCUMENTS 0034003 8/1981 European Pat. Off. .
2007698 1/1970 France .

Primary Examiner—R. J. Hickey
Attorney, Agent, or Firm—Handal & Morofsky

[57] ABSTRACT

Method for charging Ni-Cd batteries with a repetitive and alternating sequence of direct current charging and discharging periods. Steep current pulses are superimposed on the respective direct currents which have a sense equal to that of the direct current and intensity exceeding respective predetermined levels. Owing to the effects of such alternating and repetitive current pulses the surface distribution of the electrodes will change after some time and the electrode surface gradually become homogeneous.

The periodically repetitive steep current pulses can be used during the whole charging process and they have beneficial effects for the charging of new batteries as well.

The current changes at the beginning of the respective periods should be at least seven times as high as one tenth of the ampere-hour capacity of the battery.

9 Claims, 7 Drawing Sheets

METHOD FOR CHARGING NICKEL-CADMIUM BATTERIES AND CIRCUIT ARRANGEMENT FOR CARRYING OUT THE METHOD

The invention relates to a method for charging Ni-Cd batteries, in which the battery is charged during the repetitive and alternating sequence of charging and discharging periods, wherein each charging period has a predetermined first duration and each discharging period has a shorter second duration. The invention relates also to a circuit arrangement for carrying out the method.

The problems connected with the charging of Ni-Cd batteries are described in detail in our Hungarian patent specification No. 189.832. In this patent it has been pointed out that the unloaded voltage does not correlate with the amount of charges stored in a battery to a sufficient extent and there exists a high degree of deviation between the corresponding values, therefore the charging process is finished if the values of voltage samples taken with certain delay in the discharging periods reach a predetermined level. The examination of the amount of the stored charges can indeed rely on such measurements, since the fluctuation of the voltage measured after a certain amount of discharge (as determined by the extent of stored charges) is much smaller than the fluctuation of the unloaded battery voltage.

In this known patent both the charging and discharging processes are carried out with constant current values, and the intensity of the charging current is about one tenth of the ampere hour capacity of the battery and the discharging current is still smaller.

Figure 2:
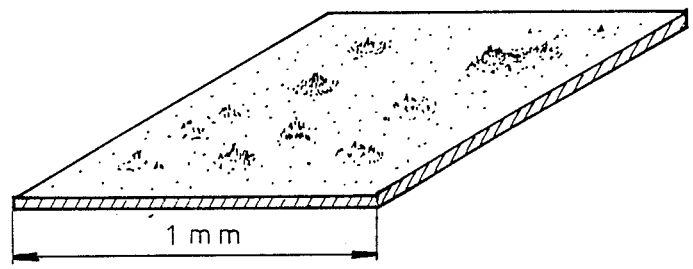

FIG. 2 of this known patent shows that during the charging process the value of the voltage samples increase with a very small steepness only, therefore the comparison of this voltage with a reference value can define the end moment of the charging process with a rather high degree of uncertainty.

Independent from the above outlined charging problems a further drawback appears when Ni-Cd batteries are used i.e. such batteries incline to get short-circuited even under normal operational conditions of use. The short-circuited batteries cannot be repaired any more, and in view of their high costs such batteries represent high losses.

During use the storage capacity of Ni-Cd batteries starts to decrease. This process is slow at the beginning and increases rapidly with time, and it will be still faster if the battery is not used for longer periods of time. There exists a number of fields of applications in which batteries with decreased storage capacity cannot be used at all, hence such batteries are disposed off.

The principal object of the invention is to provide a charging method for Ni-Cd batteries which can decrease both the hazards of short-circuits and the rate of decrease in storage capacity compared to conventional figures, which can regenerate short-circuited batteries or batteries with decreased storage capacity to a certain extent, and in which the charging process becomes more effective and less dependent from individual variations of battery parameters.

The invention is based on the recognition and utilization of the functional relationship between the phenomena that take place in batteries during use and the effects that charging imposes on these phenomena. During a charging process zones of ions are formed on and adhere to the electrode surfaces in an inhomogeneous distribution, in which metal atoms are adsorbed in a high concentration. Metal deposits of rough and large crystal grains will be formed on the electrodes and the material of such deposits is different from the metallic ions. During use of the battery the current density is changed in the vicinity of such deposits which leads first to the decrease of the storage capacity and when the deposits continue growing, short-circuits can be formed between the electrodes.

It has been recognized that during the charging of Ni-Cd batteries with a repetitive and alternating sequence of direct current charging and discharging periods if steep current pulses are superimposed on the respective direct currents which have a sense equal to that of the direct current and intensity exceeding respective predetermined levels, then owing to the effects of such alternating and repetitive current pulses the surface distribution of the electrodes will change after some time, the area of said deposits start to decrease and the electrode surface gradually becomes homogeneous.

This effect can probably be attributed to the fact that in the close vicinity of the metal deposits (and in given cases also at the short-circuited spots) the current density will be close to the diffusion limit current density, whereby a high diffusion potential is formed. The very steep alternating pulses will cause that in the proximity of the crystal grains the electrolyte will be whirling intensively increasing thereby the dissolubility of the grains in the electrolyte. Already a partial dissolution of the deposits can discontinue the existence of the short-circuits, whereby the battery will be functionally operative again.

It has also been recognised that the periodically repetitive steep current pulses can be used during the whole charging process of batteries and they have beneficial effects for the charging of new batteries as well. This can be explained by the fact that the thrusts of ionic fronts created in the electrolyte by such pulses will cause even those ions to move and to become conductive which would have otherwise remained inactive owing to the partial potential equilibrium occurring in case of conventional direct current charging. This movement provides a higher ionic activity at the surface of the electrodes in the Helmholz zone. This improves the charging efficiency, decreases the time required for full charging up. This latter property is connected also with a substantial saving in energy.

The intensive inner movement of the electrolyte prevents the formation of local ionic centers which were previously thought to be an inevitable phenomenon, furthermore prevents thereby the decrease in capacity and the hazards of short-circuits. These properties result in significant increase both in life-time and in reliability.

On the electrode surfaces of the batteries charged regularly by the method according to the invention a high number of small crystals will be formed which have a very fine structure and are electrochemically homogeneous and active, whereby an increased active surface is obtained. This increase leads to an increase of 8 to 13% in the storage capacity of the battery.

In the method according to the invention the pulses superimposed on the direct current should preferably be synchronized to the beginning of the respective charging and discharging periods in order to obtain at such beginning moments a current jump which is at least by about 7th to 7.5th times higher than the usual tenth capacity current value. In addition to such starting pulses additional pulses can also be used.

In order to provide similar phenomena at both electrodes, pulse amplitudes should be used in which the resulting changes in the current at the starting moments (current jumps) are equal in both directions of current flow. The energy of the pulses generated in the respective periods acn be adjusted to be between about 3 to 5 mWs, and from this energy the timing of the pulses can be determined for each actual current value. The magnitude of the direct current component in the charging periods should preferably be smaller than the treble of said tenth capacity current, however, it is preferable if this component takes a higher value within this upper limit. In certain types of batteries the longer use of charging direct current components higher than this limit value can be disadvantageous for the battery. The direct current component of the discharging current in the discharging periods should be chosen to be between about the third and half of the similar component of the charging current.

The end moment of the charging process should preferably be determined on the basis of voltage samples taken in the respective discharging periods preferably after a delay of about 5 seconds from the beginning of these periods. The charging process can be finished e.g. if this voltage sample reaches 1.41 V for the respective cells.

An interesting concomittant phenomen of the charging method according to the invention is that the values of these voltage samples are slightly increasing during the charging process, then just before the full charged state would be reached, they suddenly start to increase more rapidly. This steep increase in the voltage samples substantially increases the accuracy of the voltage comparison and results in uniformly charged batteries which excludes the risk of overcharging.

The circuit arrangement which is capable of carrying out the method comprises:

a charging and a similarly designed discharging circuit, the charging circuit comprises a current generator coupled to the battery and a controlled current generator for generating steeply changing current pulses which is connected in parallel to the current generator, said circuits are provided with respective start and stop inputs, in which the two parallel current generators can be implemented by a single controlled circuit generator;

a timing unit implemented preferably by a pulse generator for defining the charging and discharging periods;

controlled switches coupled to outputs of the timing unit and to the start and stop input of the charging and discharging circuits;

a voltage sensing unit for sensing the voltage of the battery in the discharging periods after predetermined delay following the beginning of these periods and for comparing the sensed voltage with a predetermined voltage level associated with the charged state of the battery; and breaking means activated by the result of the comparison for stopping the charging and discharging process if the sensed voltage exceeds said level.

Figure 3:
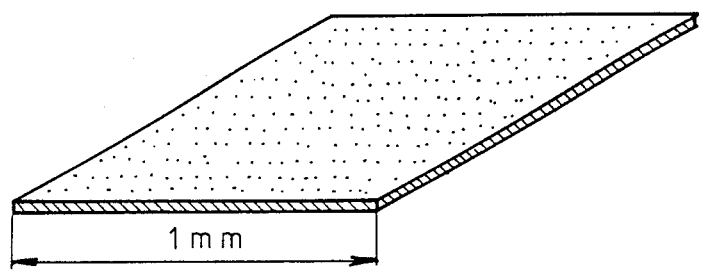
Figure 4:
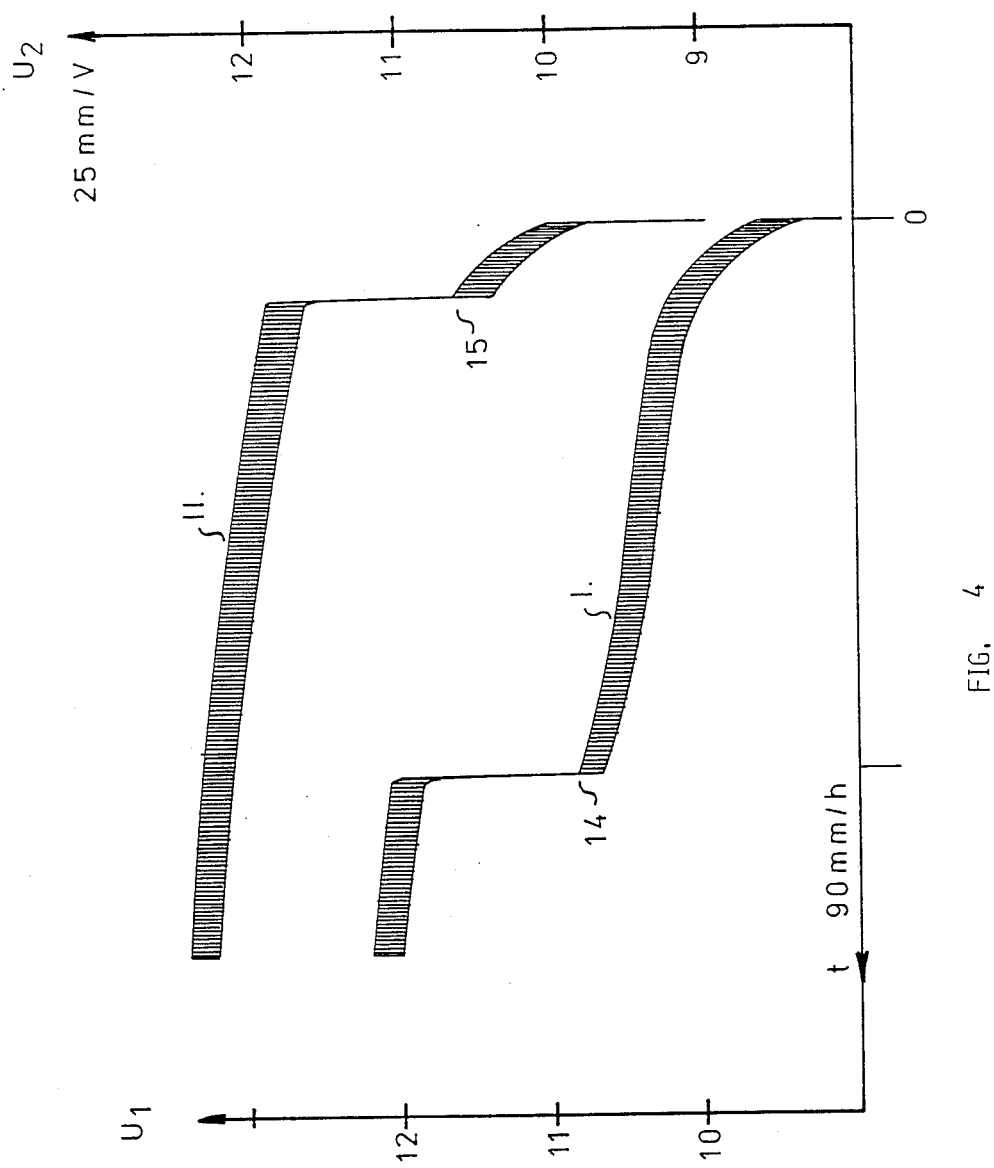
Figure 5:
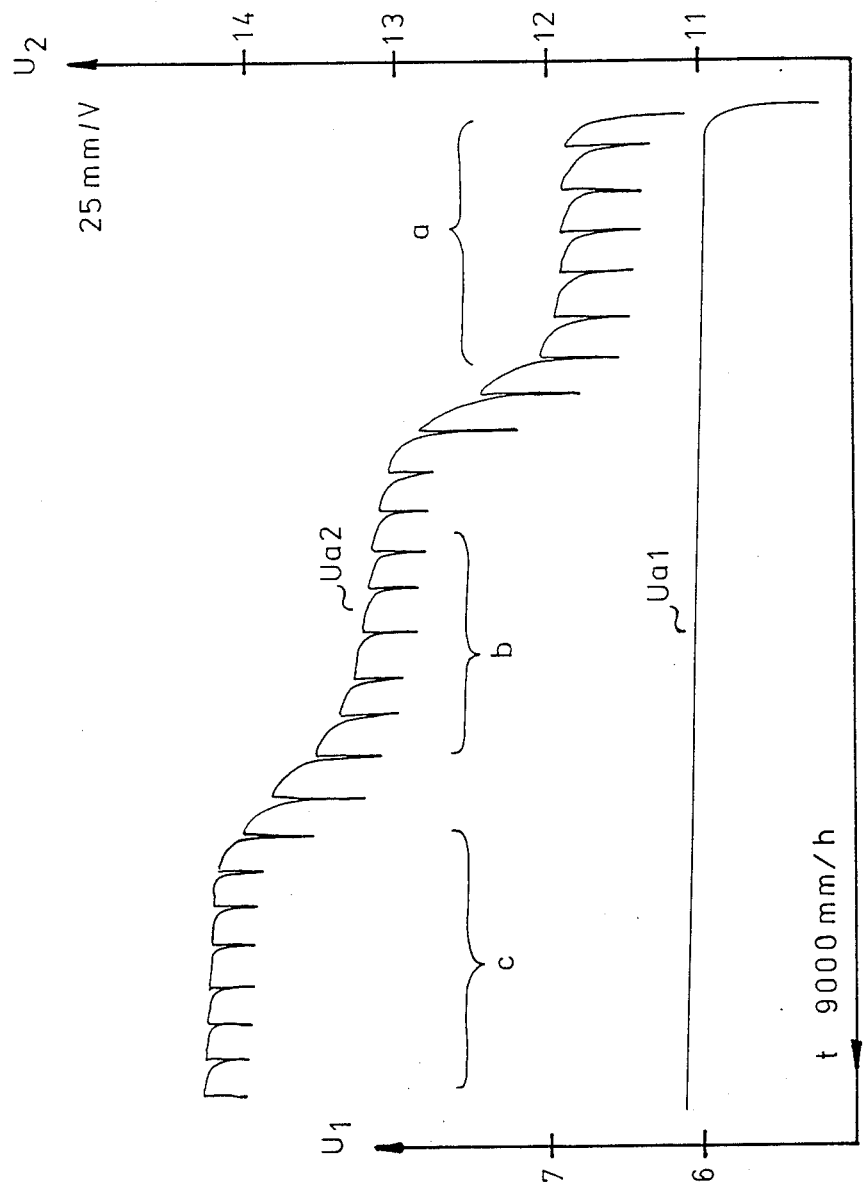
Figure 6:
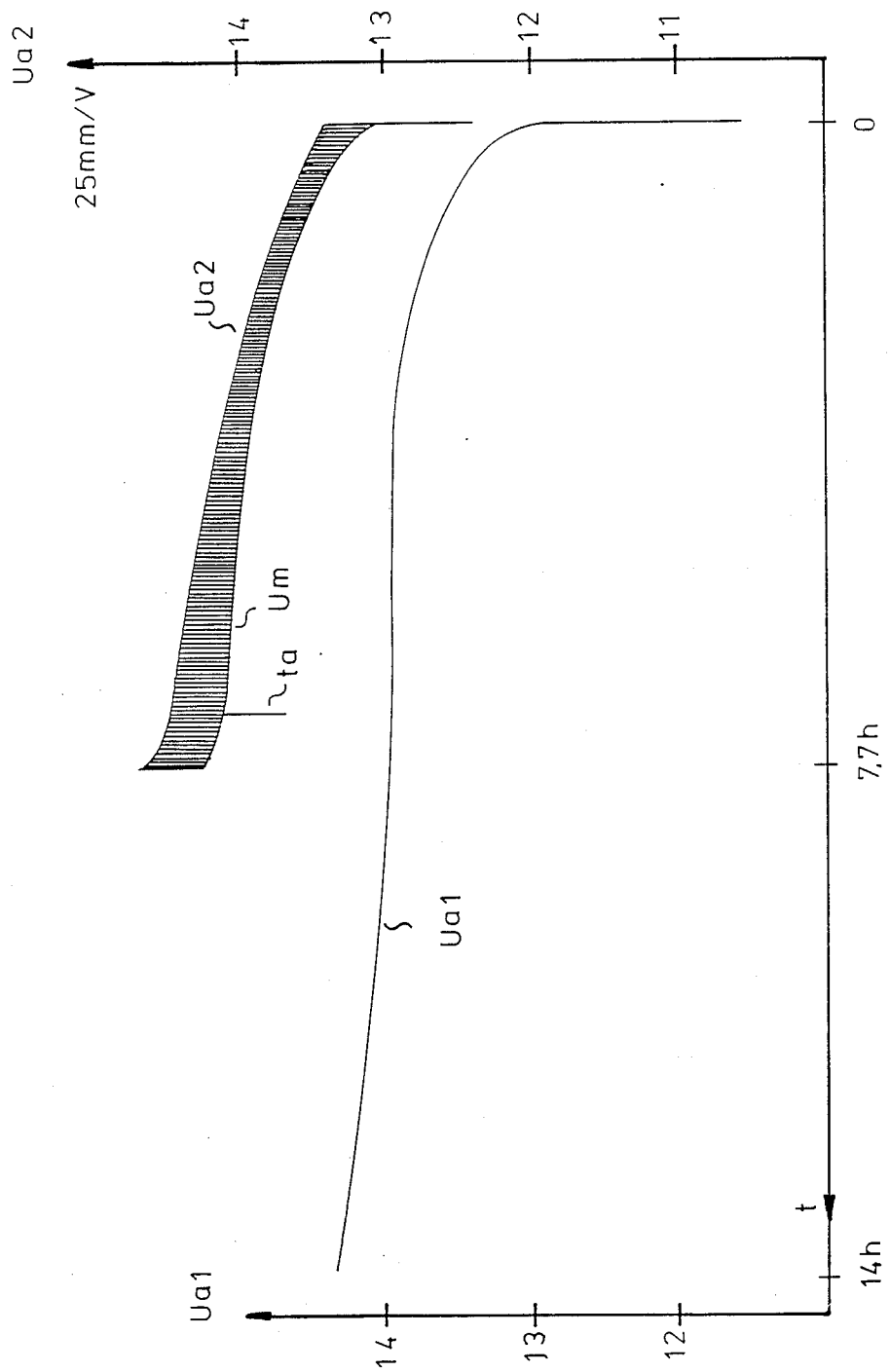
Figure 7:
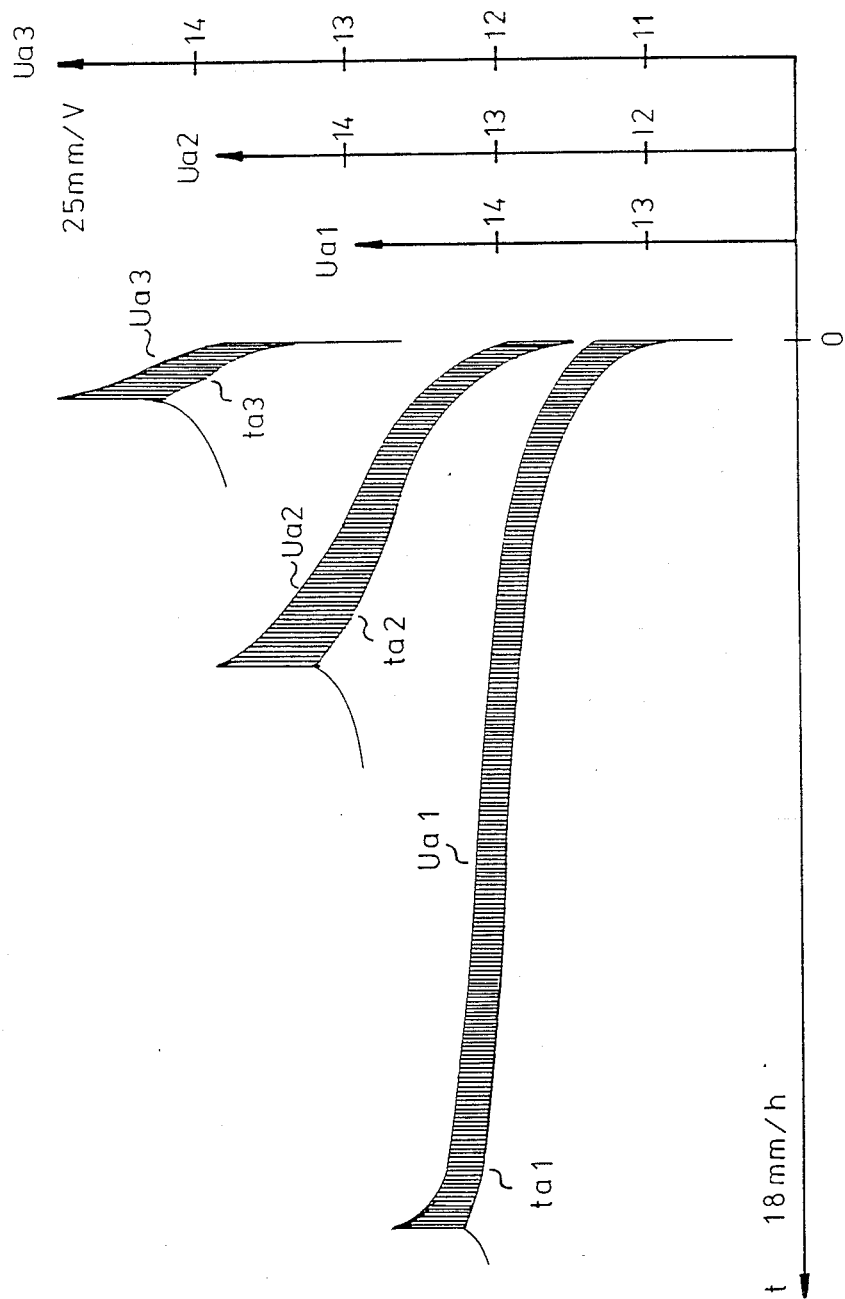
Figure 8:
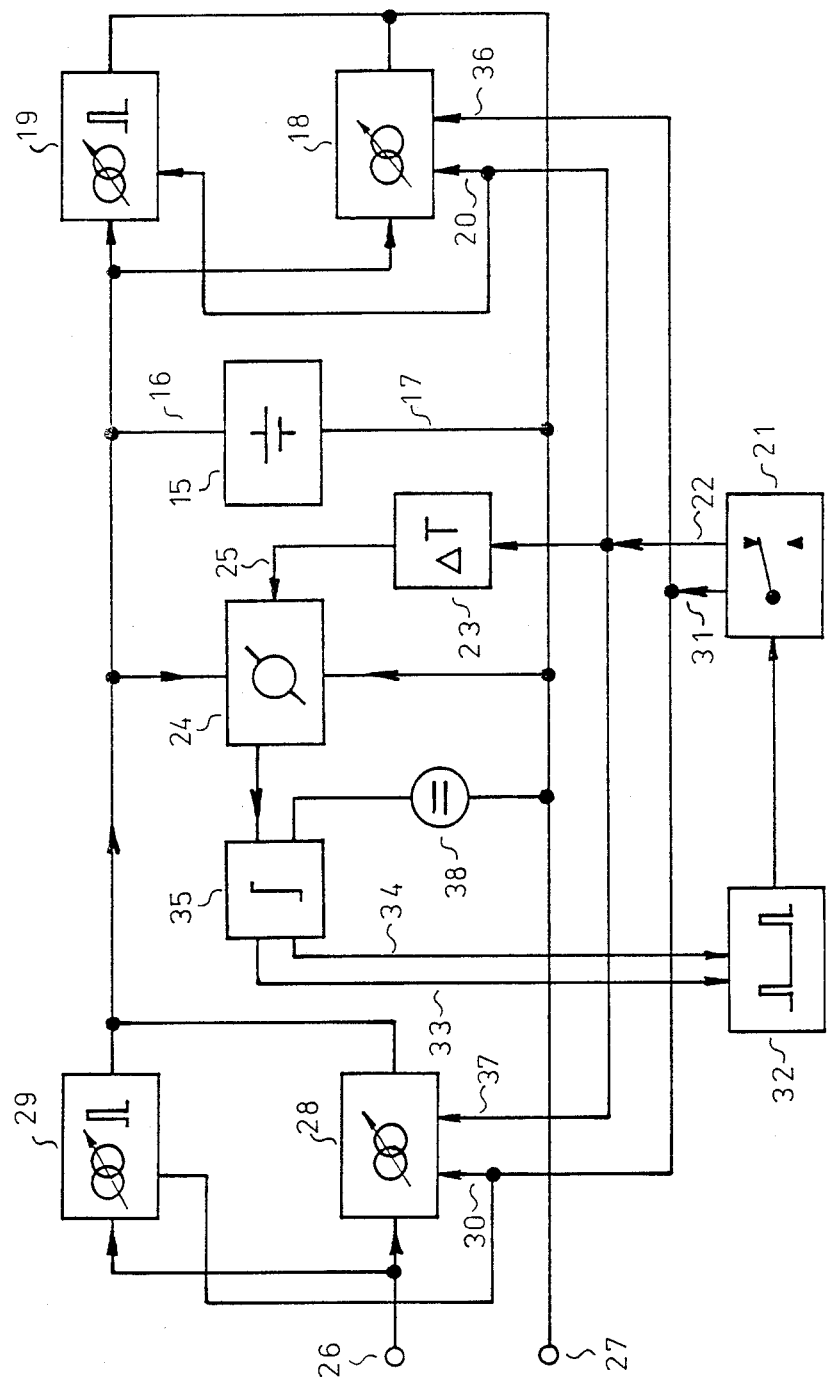

The method and circuit arrangement according to the invention will now be described in connection with preferable embodiments thereof, in which reference will be made to the accompanying drawings. In the drawing:

FIG. 1 shows a current versus time diagram showing two full cycles of the method according to the invention, FIG. 2 shows a detail of the electrode surface of a battery charged conventionally by direct current following the 22nd charging cycle in an enlarged view of 600-fold magnification, FIG. 3 is a detail similar to that shown in FIG. 2 illustrating an electrode of a similar battery charged with the method according to the invention, also after the 22nd charging cycle, FIG. 4 shows a voltage versus time curve illustrating the 'regeneration' of two previously short-circuited batteries, FIG. 5 shows a voltage versus time curve illustrating the regeneration of the storage capacity of a battery which has been out of use for more than 9 years, FIG. 6 shows the charging diagram of two discharged batteries, in which one battery is charged according to the invention and the other one is charged conventionally, FIG. 7 shows the charging diagram of three differently charged batteries, and FIG. 8 shows the block diagram of the circuit arrangement according to the invention.

During the method according to the invention the charging of a Ni-Cd battery occurs during alternating charging and discharging periods. Each charging period 10 lasts in the examplary case shown in FIG. 1 for 1 minute and the following discharging period 11 for 10 seconds. While in the charging method according to the above referred Hungarian Pat. No. 189.832 respective constant but differing charging and discharging currents were used, it can be observed in the diagram of FIG. 1 that each charging period 10 is started with an intensive short starting pulse 12, while each discharging period 11 is started with a similar discharging pulse 13 of opposite polarity, whereafter the current will be substantially constant during the end of the associated period.

The respective current values are given in FIG. 1 according to a relative scale expressed as a fraction of the storage capacity of the battery when defined in ampere-hours. The constant charging current $I_t$ in the charging periods 10 is $I_t = 2.5 . I_{10}$, while in the discharging periods 11 the constant discharging current $I_k$ is $I_k = I_{10}$, wherein $I_{10}$ designates a current corresponding to one tenth of the storage capacity in ampere-hours. The charging pulse 12 is $7.5 . I_{10}$ high above the zero axis, i.e. by a jump of $5 . I_{10}$ higher than the constant charging current $I_t$ being $2.5 . I_{10}$ itself. In the discharging periods 11 the value of the discharging pulse 13 is $-6 . I_{10}$ and the jump back to the constant discharging current $I_k$ is $5 . I_{10}$.

It can also be observed that the absolute value of the leading edge of every charging and discharging pulse 12 and 13 i.e. the full jump is equally $8.5 . I_{10}$. The energy of the pulses superiomposed on the constant current values is about 3 to 5 mWs. From this it follows that in case of a battery with a storage capacity of 500 mAh, the duration of the charging and discharging pulses 12, 13 is about 1.5 ms which is substantially shorter than the overall duration of the associated period. In the medium part of the discharging periods 11 sampling moments $t_s$ have been defined, and the control of the charging process is based on the battery voltage $U_m$ measured in the respective sampling moments $t_s$.

EXAMPLE 1

The effects of the charging method according to the invention on the surface distribution of the electrodes were examined on 4 pieces of new batteries of VARTA type 10/600RSE. Two batteries were charged by direct current according to the manufacturer's recommendations, while the other two batteries were charged with currents shown in FIG. 1. The charging was finished when the voltage of a battery cell reached the value of $U_m = 1.41$ V. After each charging period the batteries were put aside for a rest of two hours, then a discharging process was started with a current of $I_{10}$ until the cell voltage decreased to 0.9 V. After the 22nd full cycle the batteries were disassembled. FIG. 2 shows a portion of 1 mm$^2$ of an electrode of the battery charged with conventional direct current in a 600-fold magnification, and FIG. 3 is a similar view of an electrode of an other battery charged according to the invention. The characters of the two electrode surfaces are substantially different. While in FIG. 2 a number of isles are swelling out of the surface, and the vicinity of the isles is characterized by uneven, ragged and rough distribution, FIG. 3 shows a surface with uniform distribution of fine grains which gives a velvet-like visual impression.

EXAMPLE 2

For the sake of regenerating short-circuited batteries the following short-circuited i.e. unusable Ni-Cd batteries were charged with the method according to the invention used earlier: four pieces of STORNO type BU806 batteries of 225 mAh storage capacity, 2 pieces of STORNO type BU807 batteries of 45) mAh storage capacity, 2 pieces of VARTA type 8/500RS batteries of 500 mAh storage capacity and one VARTA type 10/600RSE battery of 600 mAh storage capacity. These batteries had been normally used previously for feeding mobile radio telephone sets and had been charged regularly by direct current.

In response to the charging according to the invention without any exception the voltage $U_m$ of every short-circuited cell has recovered with a series of short jumps within a period varying between 0.3 to 4 hours from the beginning of the charging and reached values between about 1.22 and 1.25 V.

The charging was continued until the voltage $U_m$ reached a value of 1.41 V for a cell. Thereafter the batteries were given 2 hours rest then they were loaded by a current of $I_{10}$ and their storage capacity was determined. This storage capacity varied between 7% and 33% of the nominal value. In the course of further charging cycles the storage capacity has gradually increased and by the end of the fifth cycle 64%-72% of the nominal storage capacity has been reached, thus the batteries have become usable again.

FIG. 1 shows the voltage versus time curves of the charging of a pair of such batteries. In the plotter used for the registration the scale of the time axis corresponds to a paper speed of 90 mm/hour increasing from left to right. In order to separate the two diagrams I and II, the left axis for the voltage $U_2$ was vertically shifted by 1 V. The vertical sensitivity was 25 mm/V.

With this time scale the charging and discharging pulses cannot be seen separately, the pulses shown are disproportional. In the respective batteries ten cells were connected in series, of which one was in short circuit state. In case of diagram I it can be observed that in about the first hour of charging the voltage increases slowly and its value corresponds to the value of nine cells connected in series and the tenth cell is continuously in short circuit state. In the moment indicated by arrow 14 the short-circuited cell has 'recovered' and the charging process has continued on a higher voltage level that corresponds to the voltage jump of about 1.2 V caused by the re-gained voltage of the tenth cell. The same has been experienced in case of the other battery, but this took place about a quarter of an hour following the beginning of the charging process in the moment designated by arrow 15.

EXAMPLE 3

The method according to the invention was tried with ten pieces of VARTA type RS4 nickel-cadmium batteries with 4 Ah storage capacity which had been out of use for more than 9 years. These batteries were charged first by the conventional direct current charging method, and in case of five batteries the voltage could not take the normal level. The voltage of the other five batteries reached the normal level, their storage capacity, however, varied between 2% and 5% of the nominal one even following the fifth conventional charging cycle.

At this moment a charging according to the invention was started. It has been experienced that within 45 minutes the voltage of all cells has taken the nominal value, and the storage capacity after the first charging cycle varied between 6% and 14% of the nominal value. The storage capacity varied between 35% and 41% of the nominal value after the fifth cycle and between 46% and 53% after the tenth cycle. With such storage capacity the batteries have become usable again.

FIG. 5 shows the charging curve of such a battery, in which diagram $U_{a1}$ shows the ineffectivity of the conventional direct current charging. Diagram $U_{a2}$ shows the 'recovery' portion of the charging according to the invention. The time scale is ten times extended compared to the previous diagram, the paper speed was 9000 mm/hour. The diagram $U_{a2}$ consists of three distinguishable sections a, b and c. In the starting section a the voltage is still low, two of the cells have not taken the normal voltage. In the end of the section a one of these cells has recovered and the corresponding voltage jump can well be observed. In the section b the charging process goes on and by the end of this section the remaining other cell has also recovered. Following the corresponding voltage jump the charging process has continued in the third section c at the nominal voltage level.

EXAMPLE 4

Original new VARTA type 10/600RSE batteries were examined for the analysis of the effects of the method according to the invention. A control group of similar new batteries was charged with a conventional direct current charging method. The charging and discharging cycles were chosen as described in Example 1. It has been experienced that by the end of the tenth cycle the storage capacity of the batteries charged according to the invention was by about 8% to 13% higher than those of the control group.

FIG. 6 shows the respective charging curves of which one has been shifted in the vertical axis by 1 V for the sake of better illustration. In the conventional direct current charging shown by diagram $U_{a1}$ the voltage increases slowly and by 14 hours following the starting moment the voltage reaches the value of 14.1 V which indicates that the charging process can be finished. In the diagram $U_{a2}$ the voltage $U_m$ of the battery is illustrated by the lower contour line. At the beginning the voltage rises slowly and in moment $t_a$ the curve becomes suddenly steeper and within a short time it reaches the level of 14.1 V when the charging process can be finished. It can be observed that this voltage curve intersects the level of comparison at a much steeper section compared to the curve of the diagram $U_{a1}$, therefore the finishing moment of the charging process will have a much smaller fluctuation due to the inevitable error of comparison, thus the hazard of an overcharging has been practically eliminated.

FIG. 6 shows that following a discharge till the voltage has reached 0.9 V per cell the batteries can be charged by the method according to the invention in much shorter time and with much less energy compared to the conventional method.

It has been experienced that the existence of the steep section which begins at the moment $t_a$ in FIG. 6 and immediately precedes the full charging of the battery is a general characteristic of the charging process made according to the invention and this is independent from the amount of charges stored in the battery before the charging process is started. This phenomenon will be verified by diagrams $U_{a1}$, $U_{a2}$ and $U_{a3}$ of FIG. 7. The vertical axes of the three diagrams are shifted by 1 V steps, respectively and the horizontal scale is 18 mm/h. Diagram $U_{a1}$ corresponds to the charging of a battery discharged up to 0.9 V (i.e. fully discharged), diagram $U_{a2}$ corresponds to the charging of a battery storing previously unknown amount of energy and diagram $U_{a3}$ corresponds to a fully charged battery which was connected again to the charging circuit following a rest of 2 hours. All the three batteries were the types referred to in Example 4. Although the time required for charging up the batteries differ owing to the differences in their initial charged states, the diagrams give a good illustration that before the charging process would be finished, the voltage versus time curves become steeper in moments $t_{a1}$, $t_{a2}$ and $t_{a3}$ and reach the level of comparison with equally steep rises.

An exemplary embodiment of the circuit arrangement for carrying out the method will be described in connection with FIG. 8. A battery 15 which should be charged has a pair of terminals 16, 17 to which a triggerable first current generator 18 and a triggerable first pulse generator 19 are coupled. The first current generator 18 has a starting input 20 connected both to starting (trigger) input of the first pulse generator 19 and to output 22 of a controlled switch 21. Output 22 is associated with the stopping of the charging and starting of the discharging. The output 22 is coupled through a delay circuit 23 to enable input 25 of a voltmeter 24 connected in parallel with the battery 15.

A source supplying energy for the charging has a pair of terminals 26, 27. Terminal 27 is connected to the line terminal 17 and terminal 26 is connected to a controlled second current generator 28 and to a triggerable second pulse generator 29. The outputs of the second current generator 28 and of the second pulse generator 19 are interconnected and coupled to the terminal 16 of the battery 15. Trigger input 30 of the second current generator 28 is connected in parallel to trigger (or starter) input of the second pulse generator 29 and coupled to output 31 of the controlled switch 21 which output enables the charging and stops the discharging processes. Control input of the controlled switch 21 is connected to output of timing unit 32 which adjusts the ratio of the lengths of the charging and discharging periods. The timing unit 32 comprises stop input 33 and starting input 34 which inputs are coupled to respective outputs of comparator 35 having complementary logical values.

The first and second current generators 16 and 28 have stop inputs 36 and 37 coupled respectively to outputs 31 and 22 of the controlled switch 21. The comparator 35 has hysteresis turn on-turn off properties and signal input thereof is connected to output of the voltmeter 24. Reference input of the comparator 35 is coupled to reference voltage source 38.

The operation of the circuit arrangement according to the invention will be explained in connection with FIG. 1.

If the voltage of the battery 15 is below the level of comparison (i.e. the voltage of source 38), then the timing unit 32 controls the controlled switch 21 with timing signals corresponding to the duration of the charging and discharging periods 10, 11 (see FIG. 1). During the charging periods 10 the output 31 and during the discharging periods 11 the output 22 of the controlled switch 21 is active.

At the beginning of the charging process the leading edge of the output 31 starts the second current generator 28 and the second pulse generator 29, which together provide a current for the battery 15 shown in period 10 of FIG. 1. In this period 10 the active state of the stop input 36 inhibits the operation of the discharging circuits.

At the beginning of the discharging period 11 the state of the controlled switch 21 is changed and in response to this change the charging circuits stop operating and the activated condition of the starting input 20 starts the first current generator 18 and the first pulse generator 19, whereby a discharging current will flow which has the form shown in period 11 of FIG. 1. At the beginning of the period 11 the delay circuit 23 is started which in the delayed sample moment $t_s$ enables the operation of the voltmeter 24 which takes a sample of the actual battery voltage $U_m$ and holds this level at its output.

This process goes on until the sampled value of the voltage $U_m$ reaches the voltage of the reference source 38. In this moment the comparator 35 turns on, disables the timing unit 32 and blocks the operation both of the charging and discharging circuits. A further circuit not shown in the drawing changes the reference voltage of the comparator 35 so that the charging process can start again if the battery voltage drops below a predetermined unloaded voltage. In this state the signal inut of the comparator 35 is connected directly to the battery terminal 16. The re-starting of the charging process is triggered if the comparator 35 is turned back again.

Of course, the two current generators and the parallel triggered pulse generators can be replaced by other equivalent circuits e.g. by current generators with controllable source current. In such an embodiment the control input of such current generator should be controlled by signals having the form shown in FIG. 1.

We claim:

1. A method for charging nickel-cadmium batteries comprising the steps of supplying said battery during charging periods of a predetermined first duration with a predetermined charging current, and loading said battery during discharging periods of a shorter predetermined second duration with a predetermined loading current, and alternatingly repeating said supplying and loading steps, wherein said supplying step includes superimposing on said charging current a charging current pulse of the same sense, at least at the beginnings of said charging periods, and wherein said loading step includes superimposing on said loading current a discharging pulse, at least at the beginning of said discharging periods, and providing thereby at the beginning of each of said periods a current charge in amperes which is in absolute magnitude at least seven times as high as one tenth of the numerical value of the storage capacity of said battery when expressed in amperehours, wherein in the respective periods a plurality of pulses are superimposed on the predetermined charging and/or discharging currents which have energy and amplitude values at most equal to the corresponding values of the pulse at the beginning of the period.

2. The method as claimed in claim 1, wherein said predetermined charging current in amperes is at most triple said one tenth of the numerical value of the storage capacity of said battery.

3. A method as claimed in claim 1, wherein said predetermined loading current is at most one half and at least one fourth of said predetermined charging current.

4. A method as claimed in claim 1, wherein the energy of said superimposed pulses is between 3 and 5 mWs.

5. A method as claimed in claim 4, wherein said current changes in the beginning of the respective periods are substantially equal.

6. A method for charging nickel-cadmium batteries comprising the steps of supplying said battery during charging periods of a predetermined first duration with a predetermined charging current, and loading said battery during discharging periods of a shorter predetermined second duration with a predetermined loading current, and alternatingly repeating said supplying and loading steps, wherein said supplying step includes superimposing on said charging current a charging current pulse of the same sense, at least at the beginnings of said charging periods, and wherein said loading step includes superimposing on said loading current a discharging pulse at least at the beginning of said discharging periods, and providing thereby at the beginning of each of said periods a current change in amperes which is in absolute magnitude at least seven times as high as one tenth of the numerical value of the storage capacity of said battery when expressed in ampere-hours, wherein the loaded voltage ($U_m$) of the battery is measured in the respective discharging periods following a predetermined delay counted from the beginning of the period, and the charging process is terminated if this measured voltage exceeds a predetermined threshold value.

7. A circuit arrangement for charging nickel-cadmium batteries comprising a charging and a loading circuit coupled to the terminals of a battery, a first current generator and a second current generator in said charging and loading circuits, respectively, which have respective start and stop inputs, a controlled switch having outputs connected to said start and stop inputs and a control input, a timing unit coupled to said control input for defining charging and discharging periods of the battery, wherein said charging and loading circuits comprise first and second pulse generators, respectively, started together with the associated one of said current generators and superimposing respective pulses with identical sense on the currents of said current generators.

8. A circuit arrangement as claimed in claim 7, wherein said first and second current generators and said first and second pulse generators are formed by a controllable generator which is capable of generating output current defined by the waveform of a control voltage, and a waveform generator is coupled to the control input of said controllable current generator providing an output signal with waveform corresponding to a predetermined current form in said charging and discharging periods.

9. A circuit arrangement as claimed in claim 7, wherein the output of the controlled switch that starts the discharging periods is coupled through a delay circuit to a starting input of a voltmeter connected to the battery, and the output of the voltmeter is coupled to the signal input of a comparator having a reference input coupled to a reference voltage source and having respective outputs connected to start and stop inputs of the timing unit.

* * * * *

UNITED STATES PATENT AND TRADEMARK OFFICE
CERTIFICATE OF CORRECTION

PATENT NO. : 4,878,007
DATED      : October 31, 1989
INVENTOR(S) : SZORADI, et al It is certified that error appears in the above-identified patent and that said Letters Patent is hereby corrected as shown below:

Title page, under item [19] "Gabor" should be --Szoradi--

[75] Inventors:   Gabor SZORADI, Sandor NAGY, both of
                  Budapest, Hungary--

Signed and Sealed this

Thirtieth Day of October, 1990

Attest:

HARRY F. MANBECK, JR.

Attesting Officer                 Commissioner of Patents and Trademarks